United States Patent [19]

Golz et al.

[11] Patent Number: 5,413,213
[45] Date of Patent: May 9, 1995

[54] APPARATUS FOR TRANSPORTING MASS FLOWS OF ARTICLES

[75] Inventors: Peter Golz, Seevetal; Andreas Rinke, Bad Oldesloe; Jürgen Krössmann, Schwerin, all of Germany

[73] Assignee: Körber AG, Hamburg, Germany

[21] Appl. No.: 157,222

[22] Filed: Nov. 23, 1993

Related U.S. Application Data

[63] Continuation-in-part of Ser. No. 97,937, Jul. 26, 1993, abandoned.

[30] Foreign Application Priority Data

Jul. 25, 1992 [DE] Germany ............................ 42 24 609

[51] Int. Cl.⁶ .............................................. B65G 21/18
[52] U.S. Cl. ........................................ 198/778; 198/812
[58] Field of Search ............... 198/443, 444, 588, 594, 198/778, 812

[56] References Cited

U.S. PATENT DOCUMENTS

| | | | |
|---|---|---|---|
| 2,788,140 | 4/1957 | Becker .................... | 198/778 |
| 3,297,138 | 1/1967 | McCombie . | |
| 3,664,487 | 5/1972 | Ballenger ................. | 198/778 |
| 4,513,858 | 4/1985 | Fellner et al. ............. | 198/812 |
| 4,549,647 | 10/1985 | Cosse ..................... | 198/594 |
| 4,565,284 | 1/1986 | Seragnoli et al. .......... | 198/812 |

FOREIGN PATENT DOCUMENTS

| | | |
|---|---|---|
| 1301843 | 1/1973 | United Kingdom . |
| 2047667 | 12/1980 | United Kingdom . |
| 2143788 | 2/1985 | United Kingdom . |

Primary Examiner—Joseph E. Valenza
Attorney, Agent, or Firm—Darby & Darby

[57] ABSTRACT

An apparatus for transporting a mass flow of rod-shaped articles of the tobacco processing industry from a first station to a remote second station has two coaxial upright helical tracks one of which extends from the first station and the other of which extends from and is at least close to the second station. One or more endless chain or belt conveyors are provided to advance the articles of the mass flow along an elongated path which is defined in part by the first and in part by the second track. The apparatus can be used as a variable-capacity first-in first-out reservoir for rod-shaped articles due to the provision of one or two bridges. If the apparatus employs a single bridge and first and second conveyors, the bridge carries a first conveying device which receives articles from the first conveyor serving to accept articles at the first station, and a second conveying device which receives articles from the first conveying device and transfers the thus received articles onto the second conveyor. If the apparatus employs a single conveyor and two bridges, the single conveyor extends along a portion of the one track, along one of the bridges to the other track, along the other track to the other bridge, along the other bridge on to the one track and back to the first station. The bridge or bridges are movable axially of as well as angularly about the common axis of the tracks.

27 Claims, 7 Drawing Sheets

APPARATUS FOR TRANSPORTING MASS FLOWS OF ARTICLES

CROSS-REFERENCE TO RELATED APPLICATION

This application is a continuation-in-part of commonly owned patent application Ser. No. 08/097,937, filed Jul. 26, 1993, by Peter Golz, Andreas Rinke and Jürgen Krössmann for "Fördervorrichtung für Zigaretten" (Apparatus for transporting cigarettes, now abandoned).

BACKGROUND OF THE INVENTION

The invention relates to improvements in apparatus for transporting articles between spaced-apart locations, e.g., between the outlet or outlets of one or more article making, storing and/or processing machines and the inlet or inlets of one or more further processing or storing machines. Typical examples of articles which can be transported in the apparatus of the present invention are rod-shaped articles of the tobacco processing industry including plain or filter (smoke generating or smokeless) cigarettes, cigars and cigarillos containing natural, reconstituted or substitute tobacco, as well as filter rod sections of unit length or multiple unit length. More particularly, the invention relates to improvements in apparatus for transporting so-called mass flows of articles, e.g., layers of parallel or substantially parallel rod-shaped articles of the tobacco processing industry. Still more particularly, the invention relates to improvements in apparatus which can transport large quantities of rod-shaped and/or other articles between one or more supplying machines and one or more consuming or processing (i.e., receiving) machines in such a way that a substantial supply of articles will normally dwell and/or advance between the supplying machine or machines and the receiving machine or machines to thus ensure that the receiving machine(s) can draw from the supply when the supplying machine(s) fails or fail to deliver articles at a desired rate or is or are idle, and that the supply can be increased by articles which are being delivered by the supplying machine(s) in the event of failure of the receiving machine(s).

Though the improved apparatus is particularly suitable for the transport of mass flows of rod-shaped articles of the tobacco processing industry, it can be utilized with equal or similar advantage for the transport of other articles which may but need not be rod-shaped and which may but need not form one or more mass flows. By way of example only, the improved apparatus can be utilized with advantage for the transport and temporary storage of catamenial tampons and/or other articles (e.g., in the form of packets, boxes or the like) which are or which can be turned out by modern mass producing machines.

A modern production line often comprises a number of different machines, apparatus, reservoirs and/or other components which serve for the making, transporting, storage and/or processing of commodities. For example, a production line which turns out filter cigarettes can contain a maker of plain cigarettes, a filter tipping machine which assembles plain cigarettes with filter rod sections to form filter cigarettes, a filter rod making machine which supplies filter rod sections to the filter tipping machine, a reservoir between the filter rod making and filter tipping machines, a reservoir between the cigarette maker and the filter tipping machine, a cigarette packing machine which receives filter cigarettes from the filter tipping machine, a reservoir between the tipping and packing machines, a cellophaning machine which is located downstream of the packing machine to provide each pack with a transparent outer envelope normally containing a so-called tear strip, a carton filling machine downstream of the cellophaning machine, and a carton boxing or baling machine downstream of the carton filling machine. The purpose of reservoirs is to avoid frequent stoppages of the entire production line, e.g., due to failure of the cigarette making machine to supply the tipping machine with a requisite quantity of plain cigarettes per unit of time or due to the failure of the filter rod making machine to supply the tipping machine with a requisite quantity of filter rod sections per unit of time. In other words, the purpose of the reservoirs is to compensate for occasional failure of adjacent machines and/or apparatus to deliver products to the next-following machines or to supply requisite quantities of such products. The reservoirs supply the products during idling of the preceding machine or machines as well as when the output of the preceding machine or machines is below normal. For example, a cigarette making machine can be temporarily out of commission as a result of tearing of cigarette paper or other wrapping material which is draped around a rod-like tobacco filler to form therewith a continuous tobacco rod which is to be subdivided into cigarettes of unit length or multiple unit length. A tipping machine is likely to be slowed down or idled in response to failure to receive so-called tipping paper which is draped about the end portions of plain cigarettes and about portions of or about entire filter rod sections to form filter cigarettes of unit length or multiple unit length.

German patent application Serial No. 33 45 117 A 1 of Mattei (Published Jun. 20, 1984) and the corresponding British patent application Ser. No. 2 133 759 disclose a production line including a cigarette making machine and a cigarette packing machine. The two machines are connected to each other by a mass flow conveyor system which is capable of transporting a multi-layer stream of plain cigarettes extending transversely of the direction of advancement from the maker to the packing machine. The conveyor system includes two so-called first-in last-out reservoirs, namely a straight horizontal reservoir and an upright reservoir which is designed to store an elongated stream of cigarettes in the form of a helix having convolutions spacedly surrounding a vertical axis. A drawback of such reservoirs is that certain cigarettes are compelled to remain therein for practically infinite periods of time. The reason is that first-in last-out reservoirs are highly unlikely to be emptied in actual use of the production line, i.e., the quantities of cigarettes which are confined therein are likely to fluctuate but at least some cigarettes will normally remain in each reservoir. These remaining cigarettes were first to be introduced into the respective reservoirs and, in the absence of intentional complete evacuation of the reservoirs at certain intervals, are apt to remain in the respective reservoirs for very long periods of time. This can affect the quality (such as the moisture content) of the confined rod-shaped articles. The just enumerated drawbacks of first-in last-out reservoirs more than compensate for their advantage, such as their ability to confine large quantities of articles in a relatively small space. This holds particularly true for an upright reservoir if such reservoir is to be used in a plant wherein the reservoir can extend vertically but has little room to extend horizontally along the floor or even at a certain distance above the floor. It has been found that losses due to a lowering of the quality of cigarettes which remain confined in the respective first-in last-out reservoirs for extended periods of time and must be discarded in order to prevent them from reaching the packing machine (and hence the consumers) are rather high and constitute a deterrent to the use of such reservoirs in many production lines.

German patent application Ser. No. 2 234 287 of Reinestad et al. (published Jan. 25, 1973) discloses belt conveyors having helically convoluted portions which can receive relatively large quantities of confined commodities. The inventors are concerned with the problem of ensuring adequate tensioning of the belt or belts for the purpose of reducing wear, slippage of conveyed commodities relative to the belt or belts and excessive energy requirements of the prime mover(s) serving to advance the belt or belts along one or more endless paths. A drawback of the conveyors which are disclosed in the application of Reinestad et al. is that they cannot accept varying quantities of commodities, i.e., the length of the path for the transport of commodities from a location where the conveyors receive such commodities to a location where the commodities leave the conveyors remains unchanged. The inventors propose to employ the belt conveyors as a means for advancing commodities (such as foodstuffs) past refrigerating, heating, sterilizing and/or other treating stations. However, the conveyors cannot be used to compensate for differences between the output or outputs of one or more supplying machines and the requirements of one or more receiving machines.

U.S. Pat. No. 4,339,025 granted Jul. 13, 1982 to McCombie discloses a conveyor for cigarettes or other rod-shaped articles which is used in a first-in last-out reservoir. The reservoir can store a larger or smaller quantity of articles; however, the articles which were first to enter the reservoir are last to leave the reservoir on their way toward the next-following machine. The drawbacks of such conveyors and reservoirs are the same as those discussed hereinabove in connection with the proposal of Mattei.

OBJECTS OF THE INVENTION

An object of the invention is to provide a novel and improved apparatus which can transport articles (e.g., rod-shaped articles of the tobacco processing industry) between spaced-apart stations in such a way that the period of dwell of all articles between the two stations is the same or nearly the same.

Another object of the invention is to provide an apparatus which can transport mass flows of rod-shaped and/or other articles in such a way that the characteristics of all articles remain unchanged or change at least substantially to the same extent during transport between any two spaced-apart portions of their path.

A further object of the invention is to provide a novel first-in first-out reservoir for use in an apparatus of the above outlined character.

An additional object of the invention is to provide a reservoir which does not take up much floor space and whose capacity can be selected practically at will.

Still another object of the invention is to provide a transporting apparatus which embodies a first-in first-out reservoir of the above outlined character.

A further object of the invention is to provide a novel and improved method of transporting articles of the tobacco processing industry between spaced-apart stations.

Another object of the invention is to provide a method which renders it possible to temporarily store large quantities of discrete commodities between two spaced apart machines or apparatus in a production line.

An additional object of the invention is to provide an apparatus which treats the conveyed commodities gently, which can be installed in existing production lines for articles of the tobacco processing industry or for other articles, and which can be adjusted (automatically, semiautomatically or manually) to accept and to temporarily store, or to dispense, larger or smaller quantities of articles.

Still another object of the invention is to provide a novel and improved method of varying the capacity of a first-in first-out reservoir for mass flows of articles.

A further object of the invention is to provide a first-in first-out reservoir for mass flows of cigarettes or other rod-shaped articles of the tobacco processing industry which can be assembled with existing machines, at its receiving end or at its discharge end, and which exhibits the advantages but does not embody the drawbacks of conventional reservoirs.

SUMMARY OF THE INVENTION

The invention is embodied in an apparatus for transporting articles between two stations. The improved apparatus comprises article transferring means including at least one elongated conveyor having an article receiving portion at one of the stations, an article discharging portion at the other station, and an elongated article advancing section between the article receiving and discharging portions. The apparatus further comprises guide means defining for the article advancing section at least a portion of an elongated path extending between the two stations, and means for varying the length of the path for advancement of articles between the two stations. The apparatus can further comprise means for delivering a mass flow of articles to the article receiving portion of the at least one conveyor at the one station, and such delivering means can include means for supplying a mass flow of rod-shaped articles of the tobacco processing industry.

The guide means of the apparatus can include a first substantially helical track and a second substantially helical track. The two tracks define the aforementioned portion of the elongated path. The first track can include means for guiding a portion of the article advancing section in a first direction and the second track can include means for guiding a portion of the article advancing section in a second direction at least in part counter to the first direction. The substantially helical tracks can include concentric convolutions which spacedly surround a common substantially vertical axis. The convolutions of the two substantially helical tracks can have at least substantially identical radii of curvature and, as already mentioned above, the convolutions can spacedly surround a common axis which is or can be a vertical axis. If the convolutions have at least substantially identical radii of curvature, the convolutions of one of the two helical tracks can alternate with the convolutions of the other helical track in the direction of their common axis.

The means for varying the length of the path for advancement of articles between the two stations can include at least one guide (e.g., a mobile bridge) defining for a portion of the article advancing section of the at least one conveyor a second portion of the elongated path. The means for varying can further comprise means for moving the guide (e.g., the aforementioned bridge) relative to the guide means to thus alter the length of that part of the elongated path along which the articles advance between the two stations. The guide means can comprise a first track for a portion at least of the article advancing section of the at least one conveyor and a second track, also for a portion of the at least one article advancing section. The guide comprises a conveyor-accepting portion movable along the first track, and a conveyor-transferring portion movable along the second track. The moving means of the means for varying can include means for moving the conveyor-accepting portion along the first track in a selected one of two directions from the one station toward the other station and from the other station toward the one station as well as for moving the conveyor-transferring portion along the second track in a selected one of two directions from the other station toward the one station and from the one station toward the other station.

If the first and second tracks of the guide means are substantially helical tracks, the guide preferably bridges selected portions of the two substantially helical tracks. The at least one conveyor of such apparatus can further comprise at least one flexible article carrier and means for advancing the at least one carrier along the first track in a first direction, along the second track in a second direction substantially counter to the first direction, and along the guide from a selected part of the first track to a selected part of the second track.

The guide means can confine a compartment (e.g., an upright chamber having a substantially circular cross-sectional outline) which is surrounded by the at least substantially helical tracks of the guide means. The guide can define an arcuate third path which extends at least in part across the compartment between selected portions of the two at least substantially helical tracks. If the at least substantially helical tracks include substantially concentric convolutions having a common substantially vertical axis, the moving means can include a support (e.g., an upright column) which is disposed in the compartment and extends in the direction of the common axis, and means for displacing the guide longitudinally of as well as about the axis. The displacing means can include means for moving the guide longitudinally of the support as a function of the lead of the at least substantially helical tracks. The moving means of such apparatus can further comprise means for controlling the displacing means as a function of predetermined operational parameters. One such parameter can include the aforementioned lead of the at least substantially helical tracks.

If the guide means for the at least one conveyor includes a first helical track extending along a first portion of the elongated path and a second helical track extending along a second portion of the elongated path, the means for varying can include a bridge extending between selected parts of the first and second tracks. The article advancing section of the at least one conveyor in such apparatus can extend from the first station along a portion of the first track, thereupon along the bridge, and thereafter along the second track to the second station. The second section of the conveyor can extend from the discharging portion to the article receiving portion, and the at least one conveyor can include an endless flexible carrier (such as a belt or a chain). The first and/or the second section of the at least one conveyor can include or constitute or form part of or extend through a variable-capacity reservoir which compensates for variations of the length of the second section. The first track of the guide means can extend from the one station toward the other station, and the second track can extend from the other station toward the one station. The second section of the at least one conveyor can extend along the second track from the other station toward the one station, and the means for varying the effective length of the path for the articles in such apparatus can comprise a first guide (such as a first elongated substantially S-shaped bridge) defining for a portion of the article advancing section a second path constituting a second portion of the elongated path and a second guide (e.g., a second elongated substantially S-shaped bridge) defining a path for the second section. The tracks preferably include convolutions surrounding a common axis, and the guides (such as the aforementioned bridges) are preferably spaced apart from one another in the direction of such common axis. The tracks can surround a compartment, and each bridge-like guide can extend across the compartment between the two tracks. The means for varying the effective length of the path for articles in such apparatus can further comprise means for moving the guides in synchronism with one another in the direction of the common axis. The moving means can comprise a support which is disposed in the compartment and extends along the common axis, a common holder for the guides mounted on the support, and means for displacing the holder (e.g., a sleeve) longitudinally of as well as about the common axis. The displacing means can include means for moving the holder longitudinally of the support as a function of the lead of helical convolutions forming part of the two tracks. The at least one conveyor of such apparatus can include an endless flexible carrier (e.g., a chain or a belt) extending from the one station along one of the tracks, thereupon along one of the guides, thereafter along the other track to the other station, and thereafter along the other guide back toward the one station. The other track can include for such carrier a portion extending between the other station and the other guide, and the at least one conveyor can further comprise means for moving the carrier in a first direction from the one station and in a second direction toward the one station.

The article transferring means can comprise the at least one conveyor and a second conveyor. The guide means of such apparatus can comprise a first helical track and a second helical track, and the article advancing section of the at least one conveyor extends along one of the tracks away from the one station in a first direction. The second section of the at least one conveyor extends toward the one station, and an article advancing section of the second conveyor extends to the other station along the other track in a second direction at least substantially counter to the first direction. A second section of the second conveyor extends from the other station to an inlet of the second track. The means for varying the effective length of the path for the articles in such apparatus preferably comprises a bridge including a withdrawing conveyor with means for accepting articles from the article advancing section of the at least one conveyor of the article transferring means, and a further conveyor having means for delivering articles from the accepting means to the article advancing section of the second conveyor. Each conveyor of the article transferring means can include an endless flexible article carrier, e.g., a chain or a belt. The article transferring means of such apparatus can further include means (e.g., driven sprocket wheels or driven toothed or smooth-surfaced pulleys) for driving the at least one conveyor and the second conveyor independently of each other, such as at different speeds.

The tracks of the guide means in such apparatus can have identical radii of curvature, identical slopes or leads and a common substantially vertical axis. The (first) convolutions of the first track can alternate with the (second) convolutions of the second track in the direction of the common axis. The bridge of the means for varying can include a carriage for the withdrawing and further conveyors. The carriage can include means defining a deflection zone for articles between the receiving and further conveyors of the bridge, and such means for varying can further comprise means for moving the carriage along the tracks about the common axis. The receiving and further conveyors can be disposed at different levels, preferably in such a way that the further conveyor is located at a level below that of the receiving conveyor, and the other station can be disposed at a third level below the two different levels; the article advancing section of the second conveyor then extends from the further conveyor and at least in part downwardly to the other station. The alternating first and second convolutions (of the first and second tracks) are preferably spaced apart from each other a predetermined distance which matches or at least approximates the distance between the aforementioned different levels of the receiving and further conveyors forming part of the bridge. The carriage preferably includes means (such as the aforementioned means defining the deflection zone) for changing the direction of advancement of articles between the receiving and further conveyors from the first direction to the second direction. The receiving conveyor can be placed adjacent and can be mounted for movement along the adjacent helical convolutions of the first track, and the further conveyor can be placed adjacent and can be mounted for movement along the helical convolutions of the second track beneath the receiving conveyor on the carriage.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawings.

DESCRIPTION OF PREFERRED EMBODIMENTS

Figure 1:
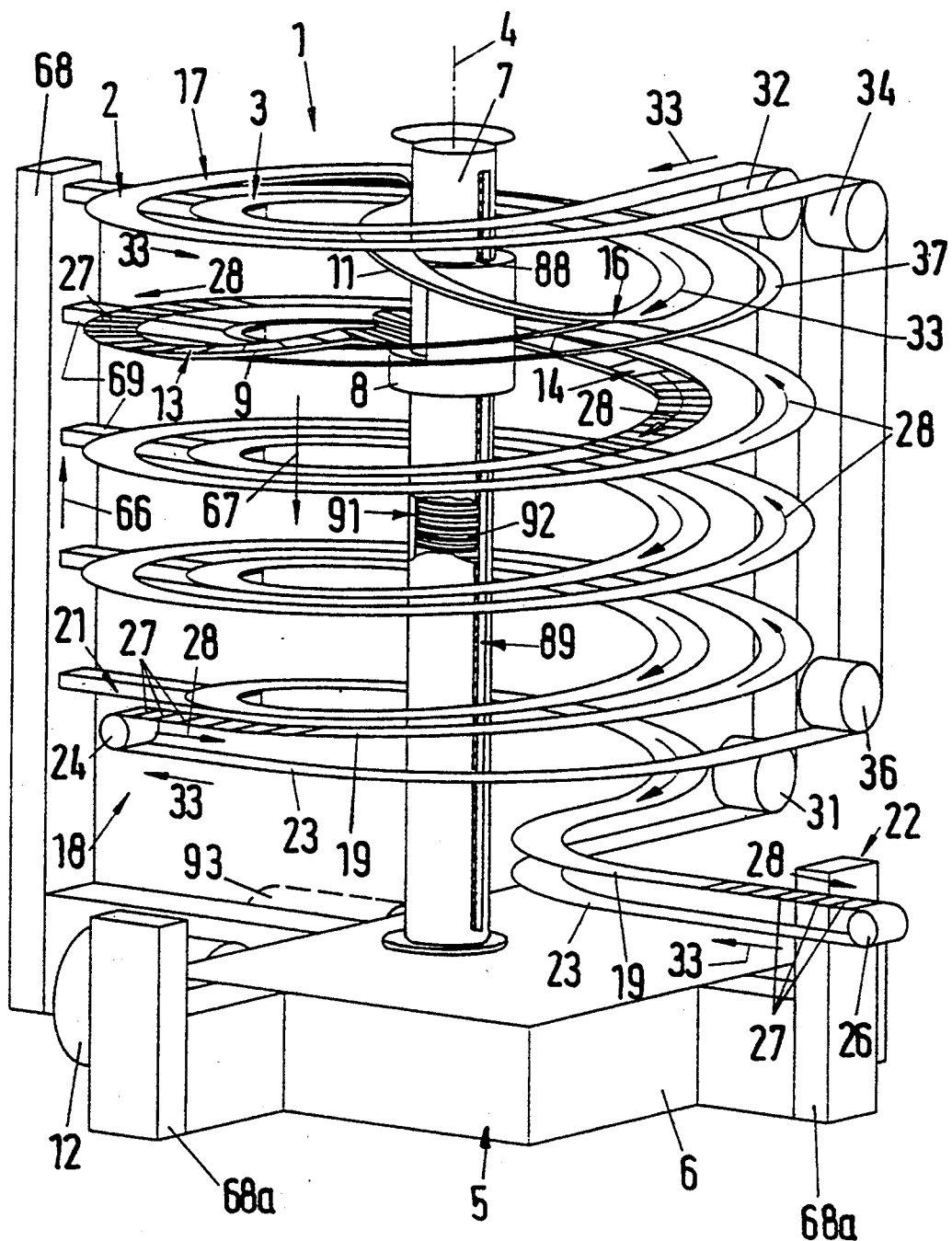
FIG. 1 is a somewhat schematic fragmentary perspective view of an apparatus which embodies one form of the invention and wherein one of the two helical tracks forming part of the guide means for a conveyor is surrounded by the other helical track.
Figure 2:
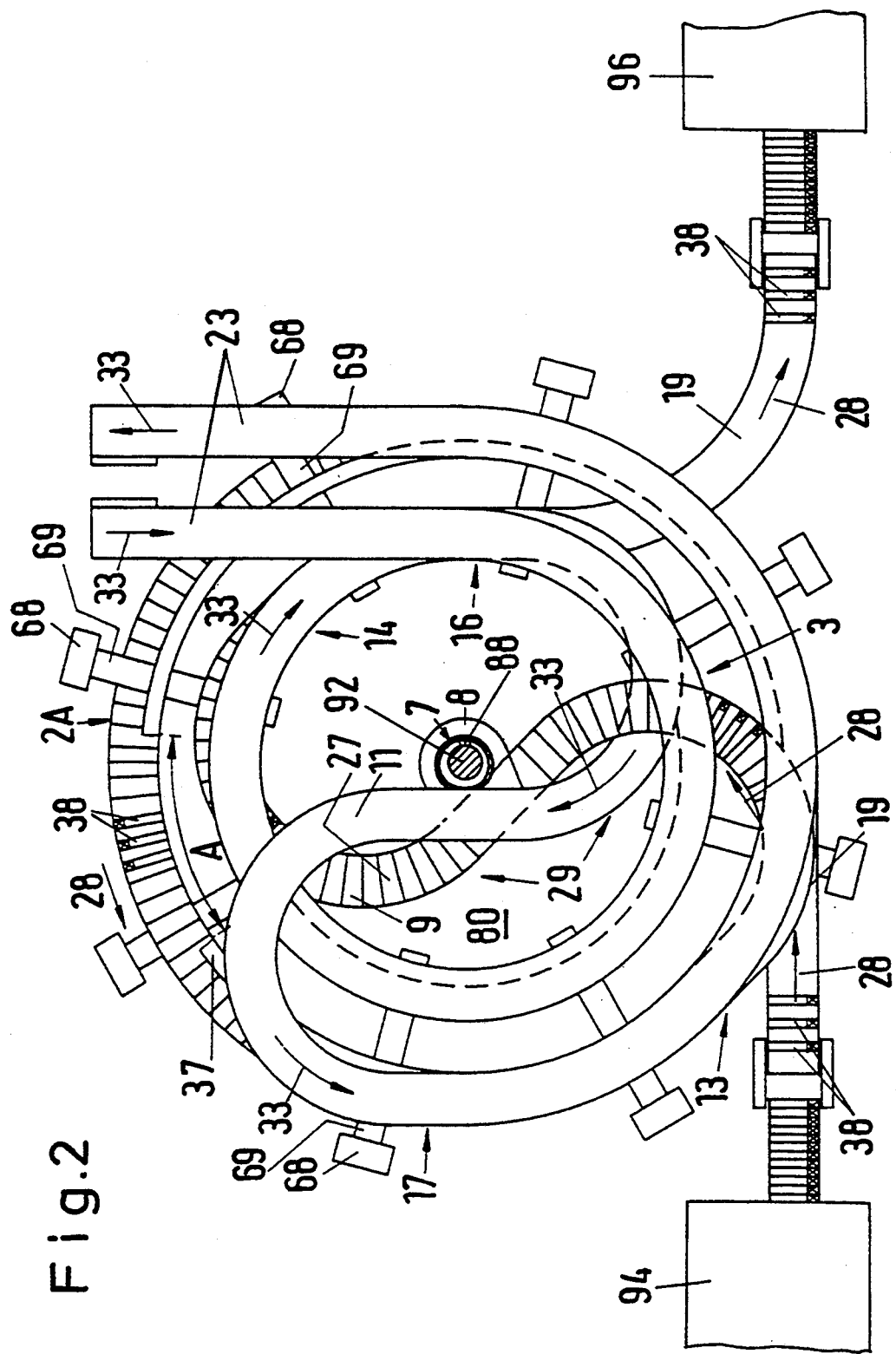
FIG. 2 is a plan view of the apparatus and further shows a machine which delivers a mass flow of rod-shaped articles to and a machine which receives the mass flow from the conveyor.

Referring first to FIGS. 1, 2, 7 and 8, there is shown an apparatus which serves to transport a mass flow 27 of rod-shaped articles 38 (such as cigarettes and hereinafter referred to as cigarettes) of the tobacco processing industry from a first station 21 to a spaced-apart second station 22. The improved apparatus comprises guide means 1 for article transferring means here shown as including a single elongated conveyor 18 having an endless flexible carrier 75 which can constitute a belt or a chain. The illustrated endless carrier 75 is a chain which is trained over sprocket wheels 24, 26, 31, 32, 34 and 36. In addition, certain sections or portions of the chain 75 are guided by two helical tracks 2 and 3 forming part of the guide means 1. The convolutions of the track 3 are equidistant from a vertical axis 4 and are located radially inwardly of convolutions constituting the track 2. The axis 4 is common to the two helical tracks 2 and 3. The lead of the track 2 is the same as the lead of the track 3. The radii of convolutions forming part of the track 3 are sufficiently smaller than the radii of convolutions forming part of the track 2 to ensure that the major portion of the track 3 is located in an upright cylindrical compartment 80 which is surrounded by the convolutions of the track 2. The tracks 2 and 3 are mounted in a frame 5 including a bottom portion or base 6 connected to several upright columns 68 outwardly adjacent the convolutions of the track 2. Each column 68 is provided with one or more arms 69 which extend substantially radially inwardly (toward the axis 4) and support the adjacent convolutions of the tracks 2 and 3. As can be seen in FIG. 2, the frame 5 can include a total of eight equidistant columns 68 with cantilever arms 69 for the convolutions of the tracks 2 and 3. FIG. 1 merely shows one complete column 68 and portions (68a) of two additional columns 68. The manner in which the convolutions of the tracks 2 and 3 are supported by the arms 69 is shown and will be described in requisite detail with reference to FIGS. 7 and 8.

The vertical axis 4 which is common to the convolutions of the tracks 2 and 3 is defined by an upright support 7 which has a circular cross-sectional outline and is located in the compartment 80 radially inwardly of the track 3. The support 7 forms part of a means for varying the length of the path for advancement of cigarettes 38 from the station 21 to the station 22, namely from an article receiving portion of the conveyor 18 (at the sprocket wheel 24) to an article discharging portion of the conveyor 18 at the sprocket wheel 26. This support 7 is rotatable about the axis 4 by a prime mover 12, e.g., a variable-speed reversible electric motor adjacent the base 6 and operatively connected to the lower end portion of the support 7 by a gear transmission, by a chain transmission or by any other suitable transmission (not shown).

The support 7 is non-rotatably connected with (i.e., it can transmit torque to) a substantially annular (e.g., sleeve-like) holder 8 for two additional guides here shown as curved bridges 9 and 11 constituting additional components of the aforementioned means for varying the effective length of the path for advancement of cigarettes 38 from the station 21 to the station 22. For the sake of simplicity, the length varying means will be referred to also as adjusting device.

The holder 8 comprises a radially inwardly extending projection 88 which constitutes a follower received in and movable along an elongated groove 89 provided in the support 7 and extending in parallelism with the axis 4. The support 7 constitutes a hollow cylinder having a vertically extending internal space 91 for an elongated feed screw 92 including a lower end portion adapted to be non-rotatably affixed to the base 6 of the stationary frame 5. Alternatively, and as actually shown in FIG. 1, the feed screw 92 is rotatably mounted in the space 91 of the support 7 and can be driven relative to and independently of the support by a second prime mover 93 (indicated bin FIG. 1 by broken lines) which can constitute a variable-speed reversible electric motor. The prime mover 12 or 93 can be omitted if the other prime mover (93 or 12) is combined with suitable transmissions which can rotate the support 7 and the feed screw 92 with or relative to each other. The arrangement can be such that the prime mover 12 or 93 can transmit torque to the support 7 and the latter or the same prime mover 12 or 93 can transmit torque to the feed screw 2. The projection 88 of the holder 8 extends through and radially inwardly beyond the groove 89 and into the helical groove which alternates with the helical external thread of the feed screw 92. Alternatively, the projection 88 can carry a second follower (not shown) in the form of a tooth or a like part which mates with the external thread of the feed screw 92 in order to ensure that the holder 8 is compelled to move up or down along the support 7 when the latter is rotated about the axis 4 relative to the feed screw 92 and/or vice versa.

If the prime mover 12 is started to rotate the support 7 about the vertical axis 4, the holder 8 rotates about the axis 4 in the same direction and such angular movement of the holder 8 is shared by the bridges 9 and 11 of the adjusting device. The projection or follower 88 then serves as a means for transmitting torque from the support 7 to the holder 8 (and hence to the guides or bridges 9 and 11). At the same time, and assuming that the feed screw 92 is not rotated by the prime mover 12 or 93, the projection 88 or the aforementioned second follower on the projection 88 causes the holder 8 to move axially of the support 7 because the projection 88 or the second follower mates with the external thread of the feed screw. If the lead of the external thread on the feed screw 92 matches the lead of the helical convolutions of the tracks 2 and 3, the motor 93 can be omitted or deactivated and the feed screw 92 can be fixedly secured to the base 6 or to any other stationary part. The holder 8 can move the bridges 9 and 11 up or down, depending on the direction of rotation of the support 7 relative to the (presumed to be fixedly mounted) feed screw 92. Such arrangement is often preferred if, and as already mentioned above, the lead or slope of the helical tracks 2, 3 matches that of the external thread on the feed screw 92. This renders it possible to reduce the initial cost (by omitting the prime mover 93) as well as the energy requirements (because the bridges 9, 11 can be moved up or down by the prime mover 12, i.e., in response to rotation of the support 7). The prime mover 93 and the mounting of the feed screw 92 for rotation in the hollow support 7 are necessary only if the lead of the external thread on the feed screw 92 departs from the lead of helical convolutions of the tracks 2, 3 forming part of the guide means 1 for the conveyor 18. The prime mover 93 is then required to rotate the feed screw 92 in a direction and at a speed such that the axial movement of the holder 8 along the support 7 is a function of the lead of convolutions of the tracks 2 and 3.

The purpose of the guides or bridges 9 and 11 is to establish connections between spaced-apart portions of the helical tracks 2, 3, i.e., each of these bridges can connect a selected portion of the track 2 with a selected portion of the track 3. The arrangement is such that the connection between the tracks 2, 3 which is established by the bridge 9 is spaced apart (as seen in the direction of the axis 4) from the connection which is established between the tracks 2, 3 by the bridge 11. The bridge 9 has a conveyor-accepting portion 13 which is movable along the track 2 and a conveyor-transferring portion 14 which is movable along the track 3. Analogously, the bridge 11 has a conveyor-accepting portion 16 which is movable along the inner track 3 and a conveyor-transferring portion 17 movable along the outer track 2. Since the angular and axial adjustments of the holder 8 for the bridges 9, 11 take place in correspondence with (as a function of) the lead of the helical tracks 2 and 3, the portions 13, 14 and 16, 17 of the respective bridges 9, 11 always move in synchronism along the corresponding helical tracks.

The conveyor 18 includes the aforementioned article receiving portion at the station 21 (i.e., at the sprocket wheel 24), the aforementioned article discharging portion at the station 22 (i.e., at the sprocket wheel 26), an elongated article advancing section 19 which overlies the bridge 9 and extends from the station 21 toward the station 22, and a second section 23 which overlies the bridge 11 and extends from the station 22 back toward the station 21. Each of the illustrated sprocket wheels 24, 26 changes the direction of movement of the adjacent portion of the chain 75 by approximately 180°. The article advancing section 19 of the conveyor 18 can be said to constitute one stretch or run of the chain conveyor 75 and serves to advance the continuous mass flow 27 of at least substantially parallel cigarettes 38 from the station 21 toward the station 22 along an elongated meandering part of the elongated path which is defined by the conveyor 18 and the bridge 9. If the mass flow 27 contains cigarettes 38, such flow normally constitutes a moving mass consisting of several superimposed layers of cigarettes and being free of gaps as seen in the direction of arrows 28, i.e., in the direction of advancement of cigarettes from the station 21 toward the station 22. It is to be recalled that a mass flow of cigarettes 38 or other rod-shaped articles of the tobacco processing industry constitutes but one of several types of commodities which can be transported in the apparatus of FIGS. 1, 2, 7 and 8 from a first station to a spaced-apart second station. For example, the conveyor 18 can be used to transport a continuous or interrupted series of cigarette packets or other packets and/or other discrete commodities which can be advanced along a meandering path.

An increment of the mass flow 27 which is deposited on the conveyor 18 at the station 21 is caused to advance in the direction of arrows 28 first along the track 2 to the accepting portion 13 of the bridge 9, thereupon over that portion of the article advancing section 19 which overlies the bridge 9 and on to the transferring portion 14, and thereafter along the track 3 to the station 22. The cigarettes 38 of the mass flow advance in a first direction from a lower level to a higher level (arrow 66 in FIG. 1) during movement along the track 2 and in a second direction, counter to the first direction, from a higher level to a lower level (arrow 67 in FIG. 1) during advancement along the track 3. The arrows 33 indicate the direction of movement of that (second) section, reach or stretch 23 of the conveyor 18 which is guided in part by the tracks 2 and 3 and does not carry any of the mass flow 27.

The bridge 9 defines a substantially S-shaped arcuate path portion 29 which extends from a selected part of the track 2 to a selected part of the track 3 across the corresponding portion of the compartment 80 within the helical convolutions of the track 2. The section 23 of the conveyor 18 includes that part of the chain 75 which extends along the non-occupied part of the guide means 1, namely along that portion of the guide means 1 which does not guide a chain portion carrying a portion of the mass flow 27 in the direction of arrows 28 from the station 21 toward the station 22. The section 23 includes a substantially horizontal first part which extends from the sprocket wheel 26 to the sprocket wheel 31, a substantially vertical part extending between the sprocket wheels 31 and 32, and a further part extending along the top convolution or convolutions of the guide 3 down to the portion 16 of the bridge 11, along the bridge 11 to the portion 17, upwardly along the top convolutions of the track 2, and along the sprocket wheels 34, 36 on to the sprocket wheel 24. That part of the track 3 which extends from the top portion 16 of the bridge 11 downwardly to the transferring portion 14 of the bridge 9 does not carry any portion of the conveyor 18, and that part of the track 3 which is located at and downstream of the transferring portion 14 of the bridge 9 serves to guide that portion (19) of the conveyor 18 which carries the cigarettes 38 of the mass flow 27 to the station 22. Furthermore, that part of the track 2 which extends from the portion 17 of the bridge 11 to the portion 13 of the bridge 11 also does not carry any portion of the conveyor 18.

That part of the track 2 which is located downwardly of the accepting portion of the bridge 9 guides that portion of the conveyor 18 which carries the cigarettes 38 from the station 21 to the station 22.

The accepting portion 16 of the bridge 11 receives that section 23 of the chain conveyor 75 which extends from and moves downwardly along the inner helical track 3, and its transferring portion 17 then delivers the chain conveyor section 23 to the outer helical track 2 where it moves upwardly and on to the sprocket wheel 34. That part of the conveyor 18 which extends beyond the substantially S-shaped bridge 11 changes the direction of its movement from that indicated by the arrow 67 to that indicated by the arrow 66 and its carrier 75 is trained over the sprocket wheels 34, 36 to return toward the sprocket wheel 24, i.e., to the station 21. The carrier or chain 75 of the conveyor 18 is driven by one or more of the sprocket wheels 24, 26, 31, 32, 34, 36 which can receive torque from one or more prime movers (not shown) in or on the frame 5, e.g., from a variable-speed electric motor in or on the base 6.

FIG. 2 illustrates the apparatus of FIG. 1 from above. The arrows 28 again indicate the direction of advancement of the article advancing conveyor section 19, and the arrows 33 again indicate the direction of movement of the unoccupied conveyor section 23. The reference character 2A denotes in FIG. 2 a portion of the outer helical track 2 of the guide means 1, namely the portion extending between the accepting portion 13 of the bridge 9 and the transferring portion 17 of the bridge 11. This portion of the track 2 does not support and/or guide any part of the chain 75. The portion 2A includes a guiding element 37 which can maintain and guide the conveyor 18 in and along a helical path. The guiding element 37 can be constituted by a suitably configured groove and/or by a suitably configured rib and/or the like.

Figure 7:
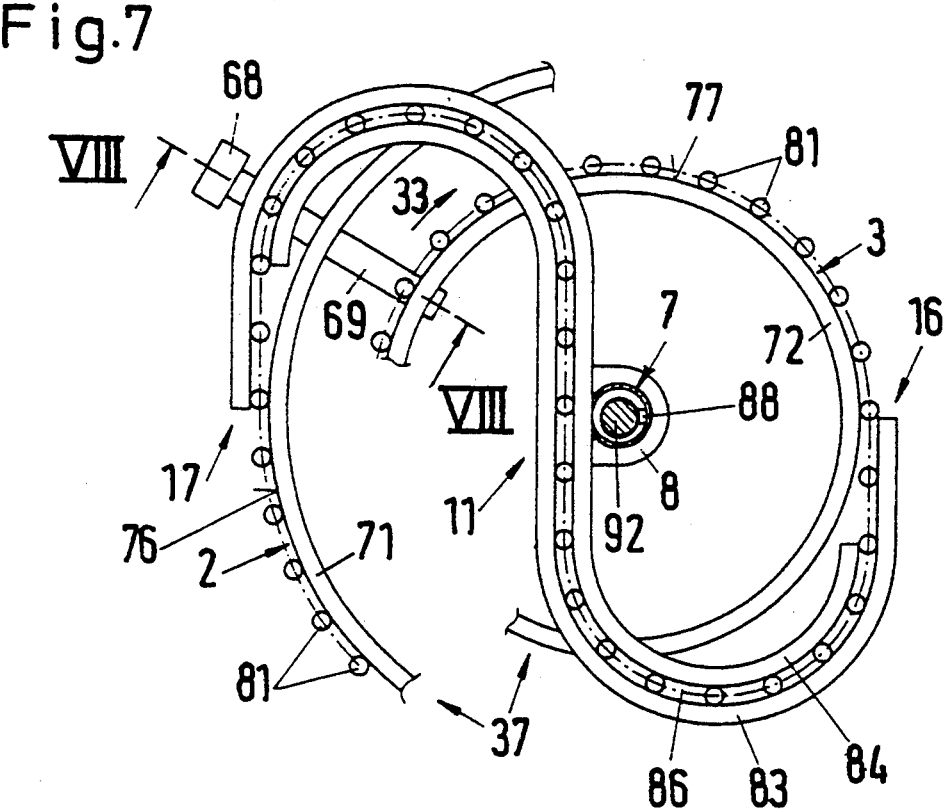
FIG. 7 is a plan view of a portion of the structure which is shown in FIG. 2.
Figure 8:
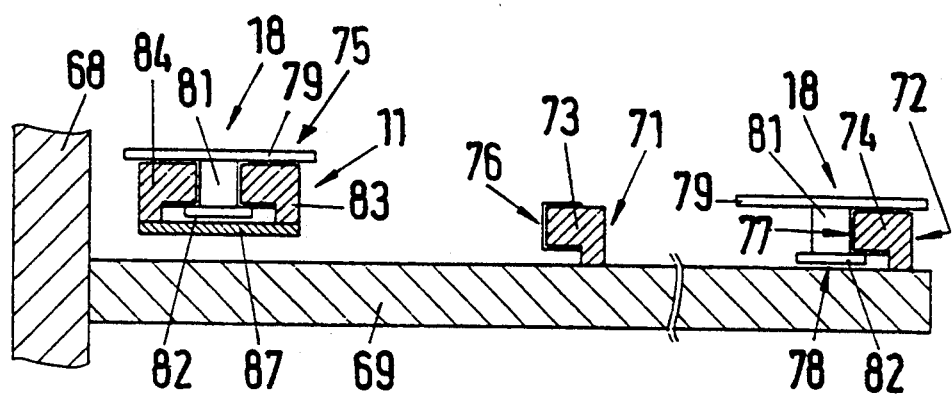
FIG. 8 is an enlarged vertical sectional view substantially as seen in the direction of arrows from the line VIII—VIII in FIG. 7.

A presently preferred form of the guiding element 37 is shown in FIGS. 7 and 8. FIG. 7 illustrates two rails 71, 72 which respectively constitute or form part of the tracks 2 and 3 and spacedly surround the vertical axis of the support 7 and holder 8. FIG. 8 shows the rails 71 and 72 in section as seen along the line VIII—VIII in FIG. 7. These rails are mounted on the substantially radially inwardly extending arms 69 forming part of the frame 5 and carried by the respective columns 68. The rails 71, 72 respectively include heads 73 and 74 the radially outer sides of which are provided with guide surfaces 76 and 77 for the chain 75 of the conveyor 18.

The section or stretch 23 of the conveyor 18 extends along those portions of its path which are shown in FIGS. 7 and 8, and the carrier or chain 75 of this conveyor includes links 78 each of which is provided with a plate-like platform 79 for actual transport of the conveyed commodities (cigarettes 38). The underside of each platform 79 is provided with a post- or pin-shaped follower 81 which is guided by the adjacent surface 76 or 77. Each follower 81 includes an enlarged portion or collar 82 which overlies the adjacent undercut portion of the head 73 or 74 of the respective rail 71 or 72. The tensional force which acts upon the chain 75 of the conveyor 18 suffices to ensure that the followers 81 remain in contact with the adjacent guide surfaces 76 and 77 in spite of the fact that the chain 75 is guided only along one side of the respective track 2, 3. It has been found that such mode of designing the guide means 1 for the chain 75 of the conveyor 18 contributes to simplicity and lower cost of the apparatus without affecting the reliability of guidance of the chain along its endless path. However, it is equally within the purview of the invention to modify the guide means 1 for and/or the conveyor 18 in a number of ways.

FIGS. 7 and 8 further show that the bridge 11 is provided with a guide slot 86 which is disposed between two spaced-apart rails 83 and 84. The width of the slot 86 is selected in such a way that it provides room for movement of the followers 81 on the links 78 of the chain 75 in the desired direction. The rails 83 and 84 extend along S-shaped paths from the accepting portion 16 of the bridge 11 at the inner track 3 to the transferring portion 17 at the outer track 2. Such rails are affixed to an S-shaped plate-like bottom wall 87 mounted on the holder 8. The construction of the other bridge 9 is identical with or analogous to the just described construction of the bridge 11. The portions 13, 14 of the bridge 9 and the portions 16, 17 of the bridge 11 are at least substantially tangential to the external guide surfaces 76, 77 of the respective helically configurated tracks 2, 3. The arrangement is preferably such that the portions 13, 14 and 16, 17 of the respective bridges 9, 11 are at least substantially flush with but need not actually contact the adjacent guide surfaces 76, 77. The suitably tensioned endless chain 75 of the conveyor 18 is capable of advancing through the clearance between the respective track 2 or 3 and adjacent end portion (13, 14, 16, 17) of the corresponding bridge 9 or 11. This can be readily seen in FIG. 7.

The portions 16 and 17 of the bridge 11 which is shown in FIGS. 7 and 8 extend tangentially of the outer sides of the adjacent portions of the helical tracks 3 and 2, respectively, but do not or need not actually contact such tracks. In other words, the end of the radially inwardly located rail 83, 84 of the respective bridge 9, 11 is out of contact with and is tangential to and flush with the guide rail 71, 72, respectively, of the adjacent track 2, 3. This ensures disturbance-free transfer of successive increments of the endless chain 75 from the track 3 or 2 onto the bridge 11 or 9 and thence onto the other track 2 or 3.

FIG. 2 shows schematically a machine 94 which serves as a means for delivering or supplying successive increments of the mass flow 27 of cigarettes 38 to the article receiving section 19 of the conveyor 18 at the first station 21. If the articles 38 are cigarettes, the machine 94 can constitute a reservoir, a maker of plain cigarettes or a filter tipping machine. The section 19 of the conveyor 18 delivers successive increments of the mass flow 27 to the station 22 which is adjacent a second machine 96, e.g., a machine which processes or stores the cigarettes 38. If the machine 94 is a maker of plain cigarettes, the machine 96 can constitute a reservoir, a filter tipping machine or a packing machine. If the machine 94 is a tipping machine, the machine 96 can constitute a reservoir or a packing machine wherein arrays of filter cigarettes are introduced into empty packets (e.g., soft packs) in a manner not forming part of the present invention. If the machine 94 is a packing machine, the machine 96 can constitute a cellophaning or carton filling machine. It is also possible to place the station 21 next to a machine (94) which includes means for evacuating the contents of successive trays for temporary storage of plain or filter cigarettes; the machine 96 of such apparatus can constitute a filter tipping machine or a packing machine or a reservoir for plain or filter cigarettes. It is also possible to employ a machine (94) which constitutes a maker of plain cigarettes or a filter tipping machine, and to deliver such articles to a machine (96) which introduces the articles into trays for temporary storage or for delivery to a remote packing machine.

Referring again to FIGS. 7 and 8, the portion 16 of the bridge 11 guides the adjacent portion of the chain 75 tangentially of and outwardly and away from the track 3 so that the collars 82 of successive followers 81 forming part of the chain 75 becomes disengaged from the rail 72 of the track 3. At such time, the collars 82 of the followers 81 moving away from the track 3 are already guided by the outer rail 83 of the bridge 11. Successive increments of the chain 75 leave the track 3 and move across the compartment 80, across the inner track 3 and on toward the outer track 2. Again, successive increments of the chain 75 move substantially tangentially of the adjacent portion of the track 2 while moving into the path portion defined by this track. During such movement of the chain 75, its followers 81 and collars 82 are guided by the rail 84 which, at such location, is disposed at the outer side of the rail 83. The collars 82 then engage and are guided by the head 73 and the followers 81 are again reliably guided along the guide surface 76.

The conveyor chain 75 can be of the type disclosed in U.S. Pat. No. 4,597,492 granted Jul. 1, 1980 to Lachonius et al. for "Conveyor Chain".

Successive increments of the article advancing section 19 of the conveyor 18 are reliably guided in similar fashion while being lifted off the outer track 2, while being advanced along the substantially S-shaped bridge 9 and while being transferred into the range of the radially inner helical track 3 which causes such increments to move downwardly (arrow 67 in FIG. 1).

A portion 2A of the topmost convolution of the track 2 is broken away in the sector A (shown in the upper part of FIG. 2) in order to illustrate the full width of the next-following convolution of the track 2. Such next-following convolution of the track 2 guides that portion of the chain 75 which advances the mass flow 27 toward the accepting portion 13 of the bridge 9. As a rule, and especially if the mass flow 27 contains cigarettes 38 or other rod-shaped articles of the tobacco processing industry, it constitutes a normally uninterrupted stream of substantially parallel articles which form two or more superimposed layers. This ensures that the improved apparatus can accommodate, if and when necessary, a huge quantity of such articles between the stations 21 and 22, i.e., between the supplying or delivering machine 94 and the second machine 96.

FIG. 2 shows that the bridges 9, 11 are mirror images of each other with reference to a plane which includes the axis 4 of the support 7 and crosses each of the tracks 2 and 3 twice, namely once at the two o'clock and once at the eight o'clock position.

The operation of the apparatus of FIGS. 1, 2, 7 and 8 is as follows:

When the machines 94 and 96 operate in the expected or desired manner, the machine 94 (e.g., a cigarette maker of the type known as PROTOS which is produced and distributed by the assignee of the present application) supplies a mass flow 27 of cigarettes 38 at the exact rate at which the cigarettes 38 advancing beyond the first station 21 are accepted by the second machine 96 (e.g., a packing machine of the type known as COMPAS which is also produced and distributed by the assignee of the present application). At such time, all articles 38 of the mass flow 27 between the stations 21 and 22 cover the same distance between the machines 94 and 96. The sleeve-like holder 8 for the guides or bridges 9 and 11 is maintained in a predetermined angular position as well as in a predetermined axial position relative to the upright support 7.

FIG. 1 shows the bridges 9 and 11 at levels and in angular positions such that the apparatus including the conveyor 18 and the guide means 1 constitutes or comprises a reservoir storing close to a maximum quantity of cigarettes 38 between the stations 21 and 22. The reason is that the holder 8 for the bridges 9 and 11 is located close to its upper end position relative to the support 7. The capacity can be increased to a maximum value by turning the bridges 9, 11 about the axis 4 through approximately 180° in a counterclockwise direction. If the machine 94 is (normally gradually) slowed down or is actually arrested for any one of a number of different reasons, i.e., if the number of articles 38 which reach the station 21 is reduced (e.g., all the way down to zero), the sprocket wheel 24 at the station 21 is brought to a halt, together with that part of the section 19 which extends along the track 2. This can be effected by employing a standard monitoring device (not shown) which tracks the number of articles 38 reaching the station 21 or the number of articles which are turned out by the machine 94 per unit of time. The machine 96 which receives articles 38 at the station 22 is assumed to operate in the customary (normal) way so that it accepts and processes (e.g., packs) a predetermined number of cigarettes 38 per unit of time. Consequently, the sprocket wheel 26 at the station 22 continues to be driven and continues to draw the article carrying part of the conveyor chain 75 along the adjacent part of the inner or second helical track 3 (arrow 28) and toward and through the station 22. Successive increments of the advancing mass flow 27 are transferred into the machine 96 so that the latter continues, or can continue, to operate at full capacity, e.g., to form a certain number of filled cigarette packets per unit of time. At the same time, the holder 8 turns about the axis 4 (i.e., with the support 7 which is driven by the prime mover 12 or 93) in a (clockwise) direction to move the bridges 9, 11 from the level of FIG. 1 to a lower level in dependency on the lead of helical convolutions forming part of the tracks 2 and 3. Thus, the conveyor-accepting portion 13 of the bridge 9 moves clockwise and downwardly along the outer helical track 2 to lift the chain 95 off this track. The thus lifted portion of the chain 75 is idle.

As the holder 8 descends along the support 7, the bridge 9 shortens those lengths of the chain 75 which are guided by the track 2 between the station 21 and the accepting portion 13 of the bridge 9 as well as by the track 3 between the transferring portion 14 and the second station 22. In other words, the length of that portion of the chain 75 which transports cigarettes 38 from the station 21 to the station 22 is reduced. Such procedure, i.e., the downward movement of the holder 8 with the bridges 9 and 11, can continue until the bridges reach their lower end positions (as seen in the direction of arrow 4), i.e., until the length of the mass flow 27 whose cigarettes 38 advance along the path extending from the station 21 to the station 22 is reduced to a minimum.

The chain 75 is stationary along the track 2 moves along the bridge 9 from the portion 13 to the portion 14 and continues to move along the track 3 and toward the station 22 as long as the bridge 9 continues to turn in a clockwise direction and to advance toward the lower end position. In such lower end position of the bridge 9, the section 19 extends from the station 21 directly over and along the bridge 9 and from the portion 14 on to the station 22. At such time, the reservoir is empty. The portion 14 is adjacent the lowermost convolution of the track 3.

The length of the empty portion of the chain 75 (namely of the portion which is caused to advance in the direction of arrows 33 from the station 22 back toward the station 21) increases proportionally with shortening of the length of the other (cigarette carrying) portion of the chain 75. When the sprocket wheel 24 is no longer driven (because the rate of delivery of cigarettes 38 from the machine 94 to the station 21 has been reduced to zero), the empty portion of the chain 75 advances (upwardly) from the driven sprocket wheel 26 at the station 22 over the sprocket wheels 31, 32 and thereupon downwardly (arrow 67) along the adjacent portion of the helical track 3 to thereafter extend along the bridge 11 to the outer helical track 2 and thereupon upwardly (arrow 66) toward the sprocket wheel 34 and further on toward the stationary (arrested) sprocket wheel 24 at the station 21. The second section 23 is stationary at the sprocket wheel 24. However, the section 23 is in motion from the pulley 26, at the pulleys 31, 32 and to the track 3. The means for moving the section 23 at the pulleys 26, 31, 32 and to the track 3 is the bridge 11 which engages the section 23. The length of the empty portion 23 of the chain 75 which advances along the outer track 2 increases as the length of the cigarette carrying portion 19 of the chain decreases. Otherwise stated, the length of that portion of the chain 75 which does not carry cigarettes 38 and is guided by the tracks 2, 3 (and the capacity of the reservoir for the empty section of the conveyor 18) increases proportionally with a reduction of the length of that portion of the chain which carries cigarettes and advances along the tracks 2, 3. Thus, the apparatus of FIGS. 1, 2, 7 and 8 can be said to constitute a means for transporting a mass flow of articles from the station 21 to the station 22; a magazine or reservoir of the so-called through flow type; and a magazine or reservoir for greater or lesser lengths of empty portion of the conveyor 18. In other words, the cigarettes 38 which are first to reach the chain 75 are first to leave the chain at the station 22 so that the desirable qualities of such cigarettes cannot be adversely affected by prolonged dwell in the improved apparatus. In addition, the apparatus constitutes a magazine for storage of variable lengths of cigarette carrying and unoccupied portions of the chain 75.

When the section 23 of the conveyor 18 is at a standstill adjacent the pulley 24 (because the latter is idle but the pulley 26 continues to deliver articles 38 to the machine 96), the bridge 11 is driven to turn in a clockwise direction and to simultaneously move downwardly in the direction of the axis 4 at a rate depending on the lead of the convolutions of the tracks 2 and 3; successive increments of the conveyor 18 are pulled over the portion 16 and onto the bridge 11 at the same rate at which the portion 17 of the conveyor 11 moves along the track 2 and at which the bridge 9 lifts the conveyor 18 off the track 2. Thus, the empty section of the conveyor 18 along the track 2 becomes longer. Since the portions 16 and 17 of the turning bridge 11 move in synchronism along the respective (stationary) tracks 3 and 2, the length of the unoccupied portion of the conveyor along the track 3 increases at the same rate as the length of the unoccupied conveyor portion along the track 2 decreases. Thus, when the bridge 11 turns in a clockwise direction and moves downwardly, as seen in FIG. 1, the section 23 overlies progressively increasing portions of the tracks 2 and 3 (such portions of the tracks 2, 3 increase in a direction from the tops toward the bottoms of the respective tracks). At the same time, the length of those portions of the conveyor 18 (namely of its chain 75) which carry articles 38 decreases because the bridges 9, 11 are caused to turn clockwise so as to move toward the lowermost convolutions of the tracks 2 and 3.

If the cigarettes 38 are to form a continuous mass flow 27, a suitable sensor (not shown) can be utilized to monitor the mass flow ahead of the pulley 24 and to arrest the drive for this pulley as soon as it detects a gap in the mass flow.

If the machine 96 which accepts or receives cigarettes 38 at the station 22 is slowed down or comes to a complete halt while the machine 94 continues to deliver to the station 21 cigarettes at a normal (maximum) rate, the sprocket wheel 26 is caused to come to a halt, e.g., as a result of monitoring the output of the machine 96. This results in a lengthening of that portion of the path which must be covered by a cigarette 38 on its way from the station 21 to the station 22 and is accomplished in that the holder 8 of the bridges 9, 11 is caused to move upwardly toward or beyond the level which is shown in FIG. 1. Thus, the length of that portion of the chain 75 which carries cigarettes 38 is increased and the length of the unoccupied portion of the chain is reduced accordingly. As the sprocket wheel 26 comes to a halt, the length of the chain portions which are guided by the upper parts of the helical tracks 2 and 3 is reduced because the bridges 9 and 11 are caused to move upwardly. Thus, the quantity of cigarettes 38 which are stored in the improved apparatus increases because no cigarettes are permitted or caused to advance beyond the second station 22. As already mentioned above, any upward movement of the holder 8 with the bridges 9 and 11 along the axis 4 involves a movement relative to as well as rotation with the support 7.

The improved apparatus can compensate for minor or major differences between the output of the machine 94 and the requirements of the machine 96. The capacity of the apparatus for storage of cigarettes 38 can be selected practically at will, i.e., by the simple expedient of increasing or reducing the overall height of the guide means 1 while the floor space requirements of the apparatus remain unchanged. Moreover, and as already pointed out hereinbefore, the improved apparatus exhibits the advantage that it constitutes a through flow reservoir in contrast to the aforedescribed conventional first-in last-out reservoirs. In other words, the period of dwell of each and every cigarette 38 in the improved apparatus is relatively short irrespective of whether or not the output of the machine 94 matches the requirements of the machine 96.

The improved apparatus can also compensate for minor deviations of the output of the machine 94 from the requirements of the machine 96 in either direction, i.e., to ensure that the machine 96 can operate at a normal speed when the machine 94 is operated at less than normal speed and vice versa. Such differences between the output of the machine 94 and the requirements of the machine 96 are compensated for by appropriate movements of the bridges 9, 11 in the direction of the axis 4, namely upwardly to store a larger quantity of cigarettes 38 and downwardly to satisfy the requirements of the machine 96 while the machine 94 turns out less than a standard number of cigarettes per unit of time.

The apparatus of FIGS. 1–4 and 7–8 exhibit the advantage that, once delivered onto the section 19 of the conveyor 18, the cigarettes 38 remain on this conveyor all the way to the station 22. The cigarettes 38 which are transported and temporarily stored in the apparatus of FIGS. 5 and 6 must be transferred onto the conveyor 39, thereupon onto the carriage 51 and thereafter onto the conveyor 41 prior to reaching the station 22. On the other hand, the apparatus of FIGS. 5 and 6 exhibits the advantage that the changes of orientation of cigarettes during advancement from the station 21 to the station 22 can be less pronounced than during transport in the apparatus of FIGS. 1–4 and 7–8.

Figure 3:
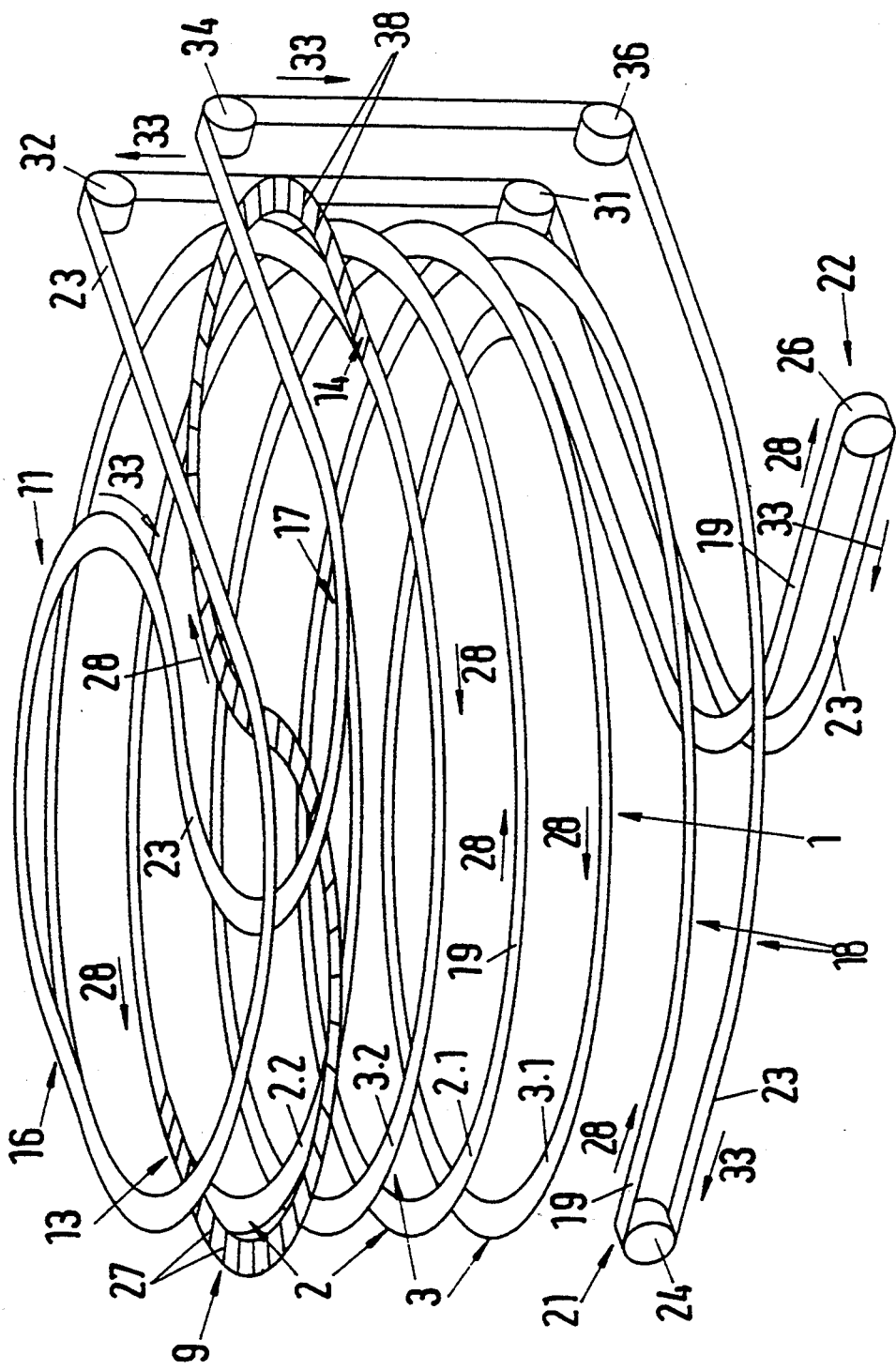
FIG. 3 is a somewhat schematic fragmentary perspective view of a second apparatus wherein the radii of convolutions of one of the helical tracks match the radii of convolutions of the other helical track.
Figure 4:
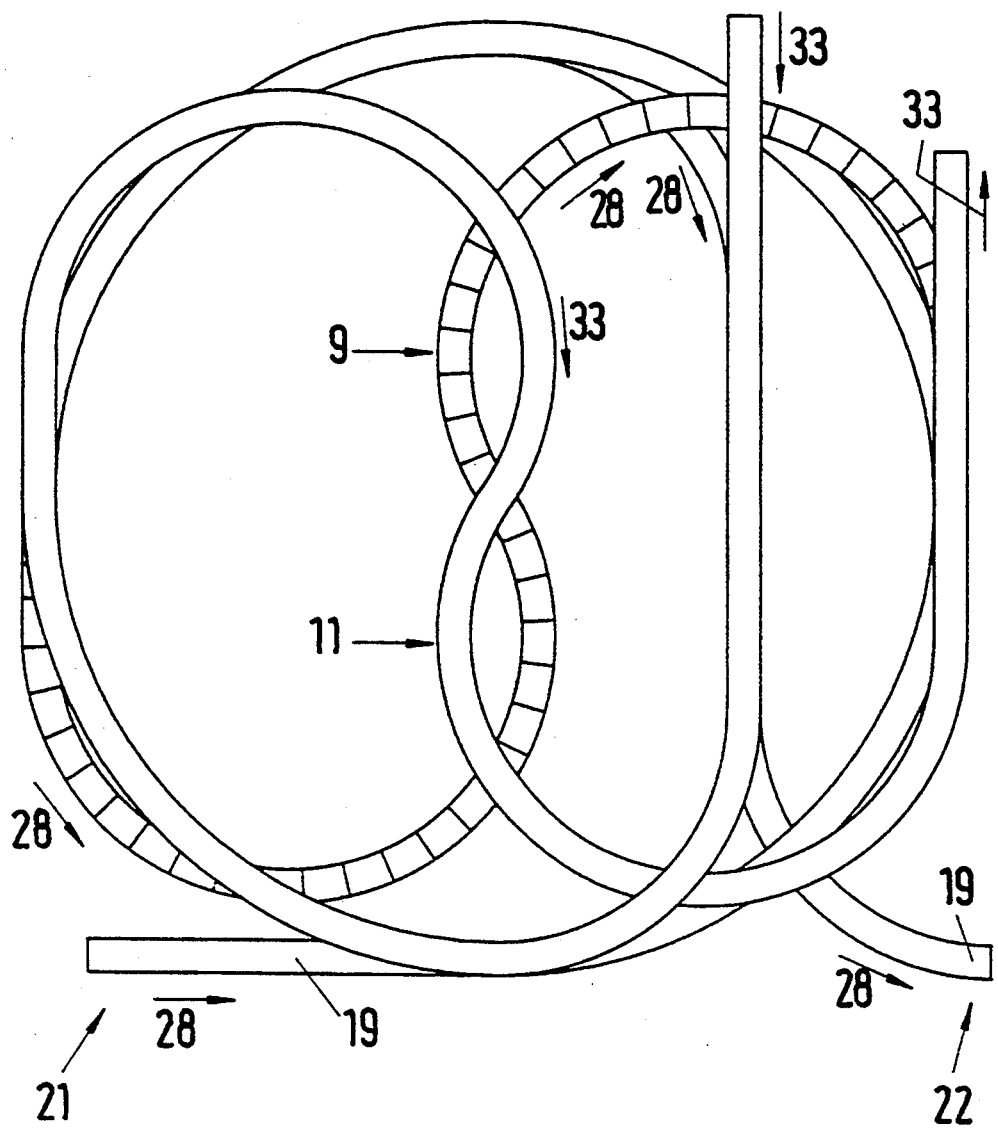
FIG. 4 is a plan view of a portion of the structure which is shown in FIG. 3.

FIGS. 3 and 4 illustrate certain portions of a second apparatus. All such parts of this second apparatus which are identical with or clearly analogous to corresponding parts of the apparatus of FIGS. 1, 2, 7 and 8 are denoted by similar reference characters. One of the differences between the two apparatus is that the convolutions (including those shown at 3.1 and 3.2) of the second helical guide or track 3 have the same radii as the convolutions (including those shown at 2.1 and 2.2) of the first helical guide or track 2. In other words, the convolutions of each of the two helical tracks have identical diameters. The common axis of all convolutions of the track 3 coincides with the common axis of all convolutions of the track 2. The convolutions of the track 3 alternate with the convolutions of the track 2 as seen in the direction of the common axis of the guide means 1 for the conveyor 18. The article advancing section 19 of the conveyor 18 extends from the first station 21 upwardly in the direction of arrows 28 and moves along the track 2 to thereupon extend along the first bridge or guide 9 in the same way as described with reference to the apparatus of FIGS. 1, 2, 7 and 8, i.e., it is deflected into the path portion extending along the track 3. The mass flow 27 of articles 38 advancing with the chain or belt of the conveyor 18 moves along the track 3 in a downward direction (as indicated by the arrows 28) on its way toward the second station 22. The empty or non-occupied second section 23 of the conveyor 18 advances along the pulleys or sprocket wheels 31, 32 (depending upon whether the conveyor 18 employs an endless belt or an endless chain) in an upward direction to advance toward and along the track 3 in a downward direction until it reaches the accepting portion 16 of the second bridge or guide 11. The latter advances the adjacent portion of the chain or belt from the track 3 to the track 2 so that the conveyor portion moves upwardly toward the pulley or sprocket wheel 34 and thereupon downwardly toward and past the pulley or sprocket wheel 36 on its way toward the pulley or sprocket wheel 24, i.e., back to the first station 21. The direction of movement of the second section 23, i.e., of the returning or empty stretch or reach of the endless belt or chain of the conveyor 18, is indicated by the arrows 33. The manner in which the bridges or guides 9 and 11 can be moved up or down and about the common axis of the tracks 2 and 3 is or can be the same as described with reference to FIGS. 1, 2, 7 and 8. The arrows 28 indicate in FIGS. 3 and 4 the direction of advancement of that stretch or reach (19) of the belt or chain of the conveyor 18 which transports the preferably continuous (uninterrupted) mass flow 27 of cigarettes 38 from the pulley or sprocket wheel 24 past the station 21 toward the pulley or sprocket wheel 26 at the station 22.

Each of the arms 69 supports a single convolution of the helical track 2 or 3 because the diameters of the convolutions of the track 2 match the diameters of convolutions of the tracks 3.

An advantage of the apparatus of FIGS. 3 and 4 over that which is shown in FIGS. 1, 2, 7 and 8 is that the radii of curvature of the convolutions forming part of the helical track 3 can be larger than those of the helical track 3 shown in FIGS. 1 and 2; this ensures that the cigarettes 38 or any other rather sensitive commodities are subjected to less pronounced deforming and/or other stresses during advancement from the station 21 toward the station 22 of FIGS. 3 and 4. The same holds true for the bridges or guides 9 and 11 in the apparatus of FIGS. 3 and 4, i.e., the curvature of these bridges can be less pronounced than that of the bridges 9, 11 used in the apparatus of FIGS. 1, 2, 7 and 8.

The end portions 13, 14 of the bridge 9 and the end portions 16, 17 of the bridge 11 in the apparatus of FIGS. 3 and 4 also extend substantially tangentially of adjacent portions of the helical tracks 2 and 3. This can be readily seen by looking at the end portions 13 and 14 of the bridge 9 as shown in each of FIGS. 3 and 4. Such configuration and mounting render it possible to employ bridges 9 and 11 with end portions 13, 14 and 16, 17 having relatively large radii of curvature which is desirable for the same reasons as explained above in connection with the radii of curvature of the tracks 2 and 3, i.e, sensitive articles (such as the cigarettes 38) are less likely to be deformed and/or otherwise adversely affected during transport of successive increments of the conveyor from the helical tracks onto the bridges or in the opposite directions.

Figure 5:
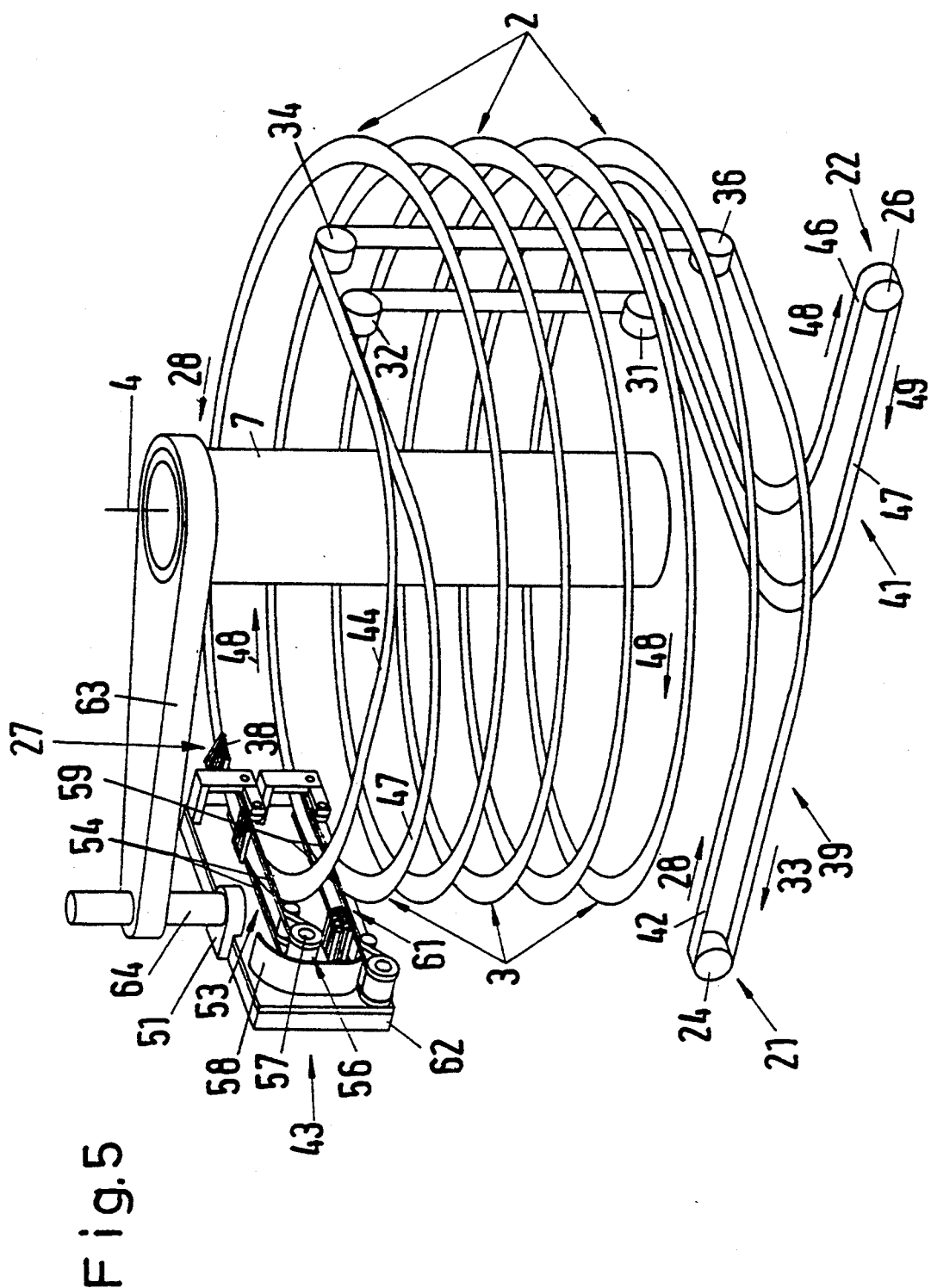
FIG. 5 is a somewhat schematic fragmentary perspective view of a third apparatus constituting a modification of the apparatus of FIGS. 3 and 4.
Figure 6:
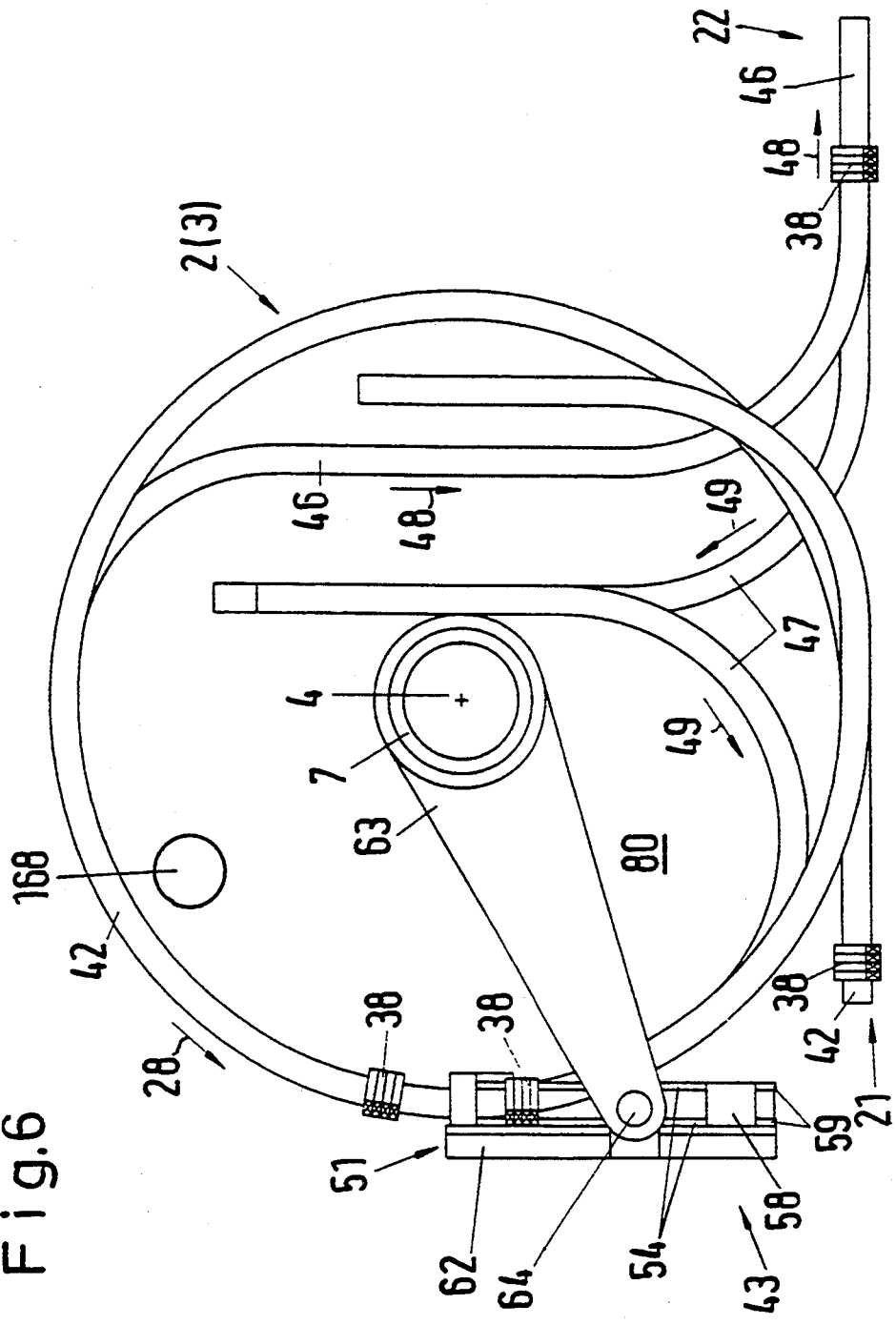
FIG. 6 is a plan view of a portion of the structure which is shown in FIG. 5.

FIGS. 5 and 6 illustrate certain parts of a third apparatus. Again all such components of the third apparatus which are identical with or clearly analogous to corresponding components of the apparatus of FIGS. 1, 2, 7 and 8 are denoted by similar reference characters.

The third apparatus is similar to the second apparatus because the convolutions of its two helical tracks or guides 2 and 3 have identical or at least nearly identical radii of curvature. Furthermore, the lead of the helical track 2 matches that of the helical track 3 (as in the first and second apparatus) and the two tracks 2, 3 in the apparatus of FIGS. 5 and 6 surround a common vertical or nearly vertical axis 4.

The main difference between the third apparatus on the one hand, and the first and second apparatus on the other hand, is that the third apparatus employs article transferring means comprising two endless conveyors 39 and 41 which can be driven independently of each other and each of which can comprise an endless belt or an endless chain. The article advancing reach or stretch or section 42 of the belt or chain forming part of the conveyor 39 extends from the first station 21 toward a guide in the form of a bridge 43, and the second or return reach, stretch or section 44 of the chain or belt of the conveyor 39 extends from the guide or bridge 43 over the pulleys or sprocket wheels 34, 36 to the pulley or sprocket wheel 24 at the station 21. The article advancing first reach, stretch or section 46 of the chain or belt forming part of the second conveyor 41 extends along the second helical track 3 from the bridge or guide 43 downwardly toward the second station 22, and the second or return stretch, reach or section 47 of the chain or belt forming part of the second conveyor 41 extends from the second station 22 over the sprocket wheels or pulleys 31, 32 and downwardly toward and along the second track 3 to terminate at the bridge 43. The direction of advancement of the chain or belt of the conveyor 41 is indicated by arrows 48. The arrows 33 indicate the direction of advancement of the second section 44 of the chain or belt forming part of the conveyor 39, and the arrows 49 indicate the direction of advancement of the second section 47 of the chain or belt of the conveyor 41.

The bridge 43 in the apparatus of FIGS. 5 and 6 includes a carriage 51 which can be moved along the outer sides of convolutions of the helical tracks 2 and 3 and serves to divert or direct the articles 38 of the mass flow 27 from one of the tracks 2, 3 to the other of these tracks, particularly from the track 2 toward the track 3. The carriage 51 supports a withdrawing conveyor 53 including two endless article accepting belts or chains 54 extending tangentially of the section or stretch 42 of the chain or belt of the conveyor 39. One of the belts or chains 54 extends tangentially of and at one side of the chain or belt of the conveyor 39, and the other belt or chain 54 extends tangentially of and is located at the other side of the chain or belt of the conveyor 39 (see FIG. 6). The article accepting belts or chains 54 of the withdrawing conveyor 53 on the carriage 51 remove the mass flow 27 of articles 38 from the section 42 of the belt or chain of the conveyor 39 and advance the removed mass flow 27 tangentially of and toward the track 2, namely toward a deflecting or direction changing zone 56 where the articles 38 are caused to move substantially vertically. The deflecting zone 56 is bounded by the rear pulley or sprocket wheel 57 for the withdrawing conveyor 53 on the one hand and, on the other hand, by a deflector or shroud 58 which can consist of metallic sheet material. The deflecting zone 56 discharges or merges into an additional or further conveyor 61 which comprises two endless belts or chains 59 serving to accept the deflected articles 38 and to deliver them to the section 46 of the conveyor 41 in opposite direction (arrow 48), namely tangentially of the section 46 of the chain or belt of the conveyor 41 which then advances along the track 3 and advances the articles 38 to the station 22.

The withdrawing conveyor 53 and the further conveyor 61 are mounted in or on a chassis or framework 62 which can be moved up and down by an elevator rod 64 mounted on an arm 63 extending radially of the axis 4 and being turnable about such axis. The arm 63 is located in a substantially horizontal plane and is carried by the upper end portion of the upright support 7.

The convolutions of the helical tracks 2 and 3 are mounted on radially extending arms of columns substantially in the same way as shown at 68 and 69 in FIG. 1. The main difference is that the columns (one shown in FIG. 6, as at 168) are located in the compartment 80 which is surrounded by the convolutions of the tracks 2 and 3. This is necessary because a column outside of the compartment 80 would interfere with movements of the bridge 43 and its carriage 51 along the external surfaces of convolutions forming part of the tracks 2 and 3.

In order to vary the effective length of the path for transport of the mass flow 27 of cigarettes 38 from the station 21 to the station 22, i.e., to vary the distance of travel of cigarettes along the tracks 2 and 3, the arm 63 is turned about the axis 4 and the carriage 51 is simultaneously moved along the elevator rod 64 in parallelism with the axis 4. This causes the carriage 51 to advance along the helical convolutions of the tracks 2 and 3, i.e., the conveyors 53 and 61 advance along the tracks 2, 3 and alter the storage capacity of the apparatus accordingly. If the capacity of the apparatus to store cigarettes 38 is to be reduced, the arm 63 is caused to turn the carriage 51 in a clockwise direction and simultaneously descends in the direction of the axis 4. If the capacity of the apparatus to store cigarettes 38 is to be increased, the arm 63 is caused to move in a counterclockwise direction and is also moved upwardly. FIG. 5 shows the carriage 51 in that position in which the capacity of the apparatus to store cigarettes 38 has been increased to a maximum value.

An advantage of the apparatus which includes the structure of FIGS. 5 and 6 is that it is not necessary to change the orientation of articles during transfer from the path portion which is defined by the track 3 to the path portion which is defined by the track 2 or vice versa.

FIG. 5 further shows that the third apparatus can be designed to transport articles having a length such that their ends extend axially beyond the inner marginal portion as well as beyond the outer marginal portion of the chain or belt forming part of the stretches or sections 42 and 46 in the conveyors 39 and 41, respectively. This enables the article accepting belts or chains 54 of the withdrawing conveyor 53 to engage the adjacent portions of the transported articles 38 and to lift them off the section 42 of the belt or chain forming part of the conveyor 39. The chain or belt of the conveyor 39 extends through the arcuate passage beneath the return stretches of the two belts or chains of the withdrawing conveyor 53. The same applies for the further conveyor 61.

If the carrier of the conveyor 18, 39 and/or 41 is an endless belt, it can be foraminous and can advance next to a suction chamber in order to attract the articles 38 of the mass flow on their way from the station 21 to the station 22. However, the utilization of one or more foraminous conveyors is not necessary because a mass flow can be advanced by a carrier in the form of an endless belt or chain without relying on suction. Reference may be had, for example, to the aforementioned published British patent application Ser. No. 2 133 759 A of Mattei. Thus, the articles 38 of the multiple-layer mass flow 27 can simply rest on the adjacent portion of a carrier in the form of an endless belt or chain (75). Such mode of transporting mass flows of cigarettes or analogous rod-shaped or other articles is well known in the tobacco processing industry. Reference may also be had to the aforediscussed U.S. Pat. No. 4,339,025 to McCombie. The disclosures of all publications which are mentioned in this specification are incorporated herein by reference.

The paths or path portions which are defined by the tracks 2, 3 of the guide means 1 are shown only schematically in order to avoid overcrowding of the Figures. The frame 5 has been omitted in FIGS. 3–6 (either entirely or substantially entirely) for the same reasons. As already mentioned above, the frame (including the column 168) which carries the tracks 2, 3 in the apparatus of FIGS. 5 and 6 is disposed within the compartment 80, i.e., it is surrounded by the tracks 2, 3 in order not to interfere with angular and/or axial movements of the carriage 51 along the outer sides of the tracks 2, 3. Alternatively, the carriage 51 can be installed in the compartment 80 to be advanced along the inner sides of the tracks 2, 3, and the frame which carries such tracks is then located externally of the guide means 1. The conveyors 53 and 61 in the thus modified apparatus of FIGS. 5 and 6 extend along arcuate paths inwardly toward the deflecting zone 56.

An important advantage of all embodiments of the improved apparatus is that it can serve as or can include a variable-capacity first-in first-out reservoir for cigarettes, other rod-shaped articles of the tobacco processing industry or any other articles which are to be transported or transferred from a first station to a second station along an elongated path of variable length. The effective length of the path determines the capacity of the improved apparatus. Such effective length is to be increased if the second machine 96 is arrested or is capable of receiving articles at less than normal rate so that the surplus is stored in the apparatus, and the effective length is to be reduced if the first machine 94 is arrested or turns out or delivers articles at less than normal rate so that the second machine 96 must receive articles which happen to be in the apparatus.

The improved apparatus accepts (at the station 21) a larger first quantity of articles 38 and discharges (at the station 22) a smaller second quantity of articles 38 if the bridge 9 or the carriage 51 is moved upwardly, and vice versa, because the effective length of the section 19 increases if the bridge 9 or the carriage 51 moves upwardly and decreases if the bridge 9 or the carriage 51 is moved downwardly.

The capacity of the improved apparatus to temporarily store articles is determined, solely or primarily, by the radial and axial dimensions of the tracks 2 and 3. The floor space requirements of an apparatus which can temporarily store large quantities of articles are particularly small if the diameters of the tracks 2, 3 are relatively small but the height of the guide means 1 in the direction of the common axis 4 is substantial. This renders it possible to install the improved apparatus in numerous plants wherein the floor space is at a premium but the roof of the establishment which is to confine the apparatus is well above the floor or ground level. In the apparatus of FIGS. 1–4 and 7–8, the capacity is varied by the simple expedient of moving at least one (such as 9) of the bridges 9 and 11 along the convolutions of the tracks 2, 3 in order to increase or reduce the length of those portions of the path for the articles 38 which are defined by the tracks 2 and 3. In the apparatus of FIGS. 6 and 7, the capacity is varied in an analogous way, i.e., by the expedient of moving the bridge 43 toward or away from the uppermost convolutions of the helical tracks 2, 3 so as to select the length of those portions of the path for the articles 38 which extend along the tracks 2 and 3. Since the holder 8 for the bridges 9, 11 and the carriage 51 of the bridge 43 can be moved up or down, the capacity of the improved apparatus can be increased or reduced in a simple and time-saving manner.

The feature that the bridges 9 and 11 extend across the compartment 80 between the tracks 2 and 3 contributes to compactness of the apparatus of FIGS. 1–4 and 7–8 as well as to gentle treatment of the articles 38 on their way from the station 21 to the station 22. Furthermore, there is no need to install any moving parts outside of the tracks 2 and 3.

The feature that the bridge or bridges 9, 11 or the bridge 43 are or is movable in dependency on one or more selected parameters of the apparatus (this can be accomplished with the prime mover 12 and/or 93) contributes to reliability of operation and reduces the likelihood of damage to the transported articles 38. One such parameter is the lead or slope of the tracks 2 and 3.

The apparatus of FIGS. 1–4 and 7–8 exhibit the important advantage that the article transferring means employs a single conveyor 18, i.e., a single endless carrier 75 in the form of a chain or belt suffices to transport articles 38 from the station 21 to the station 22 as well as to store a requisite quantity of articles within the apparatus in such a way that articles which were first to reach the carrier 75 are first to leave the apparatus by entering the machine 96. The transfer of rather sensitive articles (such as cigarettes 38 in a mass flow 27) from one endless carrier onto another endless carrier is likely to create problems as far as the appearance and/or other desirable characteristics of the articles are concerned. In addition, and as already mentioned hereinbefore, the apparatus can provide a magazine for the second section 23 of the single conveyor 18. This is accomplished in a simple and inexpensive manner in that the means for varying the effective length of the path for the articles 38 in the apparatus of FIGS. 1–4 and 7–8 includes a second bridge 11 which renders it possible to guide at least a certain part of the second section 23 of the conveyor 18 along the track 3 in lieu of necessitating the provision of additional guide means for the section 23.

The apparatus of FIGS. 5 and 6 exhibits the advantage that it can employ a single bridge 43 and that the conveyors 53, 61 on the carriage 51 of the bridge are constructed, mounted and assembled in such a way that the articles 38 are even less likely to be deformed, defaced and/or otherwise adversely affected during transport from the first conveyor 39 to the second conveyor 41. Moreover, the bridge 43 renders it possible to drive the conveyor 39 (e.g., through the medium of the pulley or sprocket wheel 24) independently of the conveyor 41 (which can be driven by the pulley or sprocket wheel 26). For example, the conveyor 39 can be driven at a first speed and the conveyor 41 can be driven at a different second speed independently of the conveyor 39. The orientation of the articles 38 need not be changed during transfer from the conveyor 39 onto the conveyor 41; this ensures gentle treatment of such articles during transfer from the higher level of the conveyor 53 to the lower level of the conveyor 61. The conveyor 41 then takes over to advance the articles 38 from the conveyor 61 to the still lower level of the second station 22. The distance between the levels of the conveyors 53, 61 matches or approximates the vertical distance between the alternating convolutions of the tracks 2 and 3.

One of the presently preferred uses of the improved apparatus is in the tobacco processing industry for the transport of rod-shaped articles, such as cigarettes 38. However, the apparatus can be used with equal or similar advantage for the transport of other types of articles or commodities which may but need not be transported in the form of a mass flow. For example, the articles can constitute packets of cigarettes or other rod-shaped articles of the tobacco processing industry, and such packets can be transported in the form of a continuous file or stream of abutting packets or as a file or stream of spaced apart packets. The rod-shaped articles or packets cannot remain in the apparatus for extended periods of time so that their desirable characteristics are highly unlikely to change during advancement from the station 21 to the station 22. Still further, the apparatus is flexible in that its maximum capacity can be increased or reduced by the simple expedient of replacing relatively short tracks 2, 3 with longer tracks or vice versa. Moreover, the apparatus is relatively simple and inexpensive and can be automated to a desired extent. Such apparatus can be used in conjunction with machines, reservoirs, apparatus and/or other constituents of existing production lines.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

What is claimed is:

1. Apparatus for transporting articles between two stations, comprising article transferring means including at least one elongated conveyor having an article receiving portion at one of said stations, an article discharging portion at the other of said stations, and an elongated article advancing section between said portions; guide means defining for said article advancing section at least a portion of an elongated path extending between said stations, said guide means including a first substantially helical track and a second substantially helical track, said tracks defining said portion of said elongated path and including concentric convolutions spacedly surrounding a common substantially vertical axis; and means for varying the length of the path for advancement of articles between said stations.

2. The apparatus of claim 1, further comprising means for delivering a mass flow of articles to said article receiving portion at said one station.

3. The apparatus of claim 2, wherein said delivering means includes means for supplying a mass flow of rod-shaped articles of the tobacco processing industry.

4. The apparatus of claim 1, wherein said first track includes means for guiding a portion of said article advancing section in a first direction and said second track includes means for guiding a portion of said article advancing section in a second direction at least in part counter to said first direction.

5. The apparatus of claim 1, wherein said convolutions have at least substantially identical radii.

6. The apparatus of claims 5, wherein the convolutions of one of said tracks alternate with the convolutions of the other of said tracks in the direction of said axis.

7. The apparatus of claim 1, wherein said means for varying the length of the path includes at least one guide defining for a portion of said article advancing first section a second portion of said elongated path.

8. The apparatus of claim 7, wherein said means for varying further comprises means for moving said guide relative to said guide means to thus alter the length of that part of said elongated path along which the articles advance between said stations.

9. The apparatus of claim 8, wherein said guide means includes a first track for a portion at least of said article advancing section and a second track also for a portion at least of said article advancing section, said guide including a conveyor-accepting portion movable along said first track and a conveyor-transferring portion movable along said second track.

10. Apparatus for transporting articles between two stations, comprising article transferring means including at least one elongated conveyor having an article receiving portion at one of said stations, an article discharging portion at the other of said stations, and an elongated article advancing section between said portions; guide means defining for said article advancing section at least one portion of an elongated path extending between said stations, said guide means including a first substantially helical track for a portion at least of said article advancing section and a second substantially helical track also for a portion at least of said article advancing section; and means for varying the length of the path for advancement of articles between said stations, including at least one guide defining for a portion of said article advancing section a second portion of said elongated path, said means for varying further including means for moving said guide relative to said guide means to thus alter the length of that part of said elongated path along which the articles advance between said stations and said guide including a conveyor-accepting portion movable along said first track and a conveyor-transferring portion movable along said second track, said guide bridging selected portions of said substantially helical tracks and said at least one conveyor comprising at least one flexible article carrier and means for advancing said at least one carrier along said first track in a first direction, along said second track in a second direction substantially counter to said first direction and along said guide from a selected part of said first track to a selected part of said second track.

11. The apparatus of claim 10, wherein said moving means includes means for moving said accepting portion of said guide along said first track in a selected one of two directions from said one station away and toward said one station and for moving said transferring portion of said guide along said second track in a selected one of two directions from said other station away and toward said other station.

12. The apparatus of claim 10, wherein said guide means confines a compartment which is surrounded by said helical tracks, said guide defining an arcuate path extending at least in part across said compartment between selected portions of said helical tracks.

13. The apparatus of claim 12, wherein said helical tracks include substantially concentric convolutions having a common substantially vertical axis, said moving means including a support disposed in said compartment and extending in the direction of said axis and means for displacing said guide longitudinally of as well as about said axis.

14. The apparatus of claim 13, wherein said helical tracks have a predetermined lead and said displacing means includes means for moving said guide longitudinally of said support as a function of said lead.

15. The apparatus of claim 13, wherein said moving means further comprises means for controlling said displacing means as a function of predetermined operational parameters.

16. Apparatus for transporting articles between two stations, comprising article transferring means including at least one elongated conveyor having an article receiving portion at one of said stations, an article discharging portion at the other of said stations, and an elongated article advancing section between said portions; guide means defining for said article advancing section at least a portion of an elongated path extending between said stations, said guide means including a first helical track extending along a first portion of said elongated path and a second helical track extending along a second portion of said elongated path and means for varying the length of the path for advancement of articles between said stations, including a bridge extending between selected parts of said first and second tracks, said article advancing section extending from said first, station along a portion of said first track, thereupon along said bridge and thereafter along said second track to said second station.

17. The apparatus of claim 16, wherein said at least one conveyor further includes a second section extending from said discharging portion toward said receiving portion.

18. The apparatus of claim 17, wherein said at least one conveyor is an endless flexible article carrier.

19. The apparatus of claim 18, wherein the second section of said at least one conveyor extends through a variable-capacity reservoir which compensates for variations of the length of said second section.

20. Apparatus for transporting articles between two stations comprising article transferring means including at least one elongated conveyor having an article receiving portion at one of said stations, an article discharging portion at the other of said stations, and an elongated article advancing section between Said portions; guide means defining for said article advancing section at least a portion of an elongated path extending between said stations, said guide means comprising a first substantially helical track and a second substantially helical track, said at least one conveyor further including a second section extending from said other station toward said one station; and means for varying the length of the path for advancement of articles between said stations, including a first guide defining for a portion of said article advancing section a second path constituting a second portion of said elongated path and a second guide, defining a path for a portion of said second section, said second section extending along said second track in said second direction, along said first track in said first direction substantially counter to said second direction and along said guide from a selected part of said second track to a selected part of said first track.

21. The apparatus of claim 20, wherein each of said guides includes an elongated bridge, said tracks having convolutions surrounding a common axis and said bridges being spaced apart from one another in the direction of said axis.

22. The apparatus of claim 21, wherein said tracks surround a compartment and each of said bridges extends across said compartment between said tracks, said means for varying further comprising means for moving said bridges in synchronism in the direction of said axis.

23. The apparatus of claim 22, wherein said moving means comprises a support disposed in said compartment and extending along said axis, a common holder for said bridges, said common holder being mounted on said support, and means for displacing said common holder longitudinally of as well as about said axis.

24. The apparatus of claim 23, wherein the convolutions of said tracks have a predetermined lead, said displacing means including means for moving said common holder longitudinally of said support as a function of said lead.

25. The apparatus of claim 20, wherein said at least one conveyor includes an endless flexible carrier extending from said one station along one of said tracks in a first direction, thereupon along one of said guides, thereafter in a second direction counter to said first direction along the other of said tracks to said other station, thereupon along the other of said tracks in said second direction, further along the other of said guides and then along the one of said tracks in said first direction, and back toward said one station.

26. The apparatus of claim 25, wherein said other track includes for said carrier a portion extending between said other station and said other guide, said at least one conveyor further comprising means for moving said carrier in a direction from said one station and in a direction toward said one station.

27. Apparatus for transporting articles between two stations, comprising article transferring means including at least one elongated conveyor having an article receiving portion at one of said stations, an article discharging portion at the other of said stations, and an elongated article advancing section between said portions; guide means defining for said article advancing section at least one portion of an elongated path extending between said stations, said guide means including a first track for a portion at least of said article advancing section and a second track also for a portion at least of said article advancing section; and means for varying the length of the path for advancement of articles between said stations, including at least one guide defining for a portion of said article advancing section a second portion of said elongated path, said means for varying further including means for moving said guide relative to said guide means to thus alter the length of that part of said elongated path along which the articles advance between said stations, said guide including a conveyor-accepting portion movable along said first track and a conveyor transferring portion movable along said second track.

* * * * *